US011221855B2

(12) United States Patent
Xiao et al.

(10) Patent No.: US 11,221,855 B2
(45) Date of Patent: Jan. 11, 2022

(54) TRANSFORMATION OF AN ENTERPRISE APPLICATION INTO A CLOUD NATIVE APPLICATION

(71) Applicant: International Business Machines Corporation, Armonk, NY (US)

(72) Inventors: Jin Xiao, White Plains, NY (US); Anup Kalia, Elmsford, NY (US); Jinho Hwang, Ossining, NY (US); Maja Vukovic, New York, NY (US); John Rofrano, Mahopac, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/811,586

(22) Filed: Mar. 6, 2020

(65) Prior Publication Data

US 2021/0279066 A1 Sep. 9, 2021

(51) Int. Cl.
*G06F 9/44* (2018.01)
*G06F 9/38* (2018.01)
*G06F 9/455* (2018.01)
*G06F 9/50* (2006.01)
*G06F 9/30* (2018.01)

(52) U.S. Cl.
CPC ......... *G06F 9/3891* (2013.01); *G06F 9/3005* (2013.01); *G06F 9/45508* (2013.01); *G06F 9/5061* (2013.01)

(58) Field of Classification Search
CPC .. G06F 9/3891; G06F 9/3005; G06F 9/45508; G06F 9/5061

USPC ........................................ 717/106, 174–178
See application file for complete search history.

(56) References Cited

U.S. PATENT DOCUMENTS

| 8,949,654 | B2 | 2/2015 | Hasit |
| 9,542,232 | B2 | 1/2017 | Beaty et al. |
| 9,558,441 | B2 | 1/2017 | Bachelor et al. |
| 9,661,064 | B2 | 5/2017 | Kranz et al. |
| 10,250,461 | B2 | 4/2019 | Amendjian et al. |
| 10,412,195 | B2 | 9/2019 | Hwang et al. |
| 10,681,076 | B1 * | 6/2020 | Long ................... H04L 63/1433 |

(Continued)

OTHER PUBLICATIONS

Title: Co-transformation to cloud-native applications: development experiences and experimental evaluation author:J Spillner published on 2018.*

(Continued)

*Primary Examiner* — Chameli Das
(74) *Attorney, Agent, or Firm* — Amin, Turocy & Watson, LLP

(57) ABSTRACT

Systems, computer-implemented methods, and computer program products to facilitate transformation of an enterprise application into a cloud native container are provided. According to an embodiment, a system can comprise a memory that stores computer executable components and a processor that executes the computer executable components stored in the memory. The computer executable components can comprise an analysis component that employs a model to discover attributes of an enterprise application. The computer executable components can further comprise a transformation component that generates artifacts based on the attributes to transform the enterprise application into a cloud native container.

20 Claims, 11 Drawing Sheets

(56) References Cited

U.S. PATENT DOCUMENTS

| | | | |
|---|---|---|---|
| 2008/0234973 A1* | 9/2008 | Ali | G06K 9/00503 |
| | | | 702/179 |
| 2012/0102103 A1 | 4/2012 | Jacobson et al. | |
| 2015/0248559 A1* | 9/2015 | Madou | G06F 21/577 |
| | | | 726/25 |
| 2015/0288618 A1* | 10/2015 | Jaisinghani | H04L 47/827 |
| | | | 709/226 |
| 2016/0188314 A1* | 6/2016 | Holmes | G06F 9/5077 |
| | | | 717/170 |
| 2018/0032322 A1 | 2/2018 | Jagannath et al. | |
| 2018/0145885 A1* | 5/2018 | Rao | H04L 43/062 |
| 2018/0191582 A1* | 7/2018 | Amendjian | H04L 41/5058 |
| 2018/0196832 A1 | 7/2018 | Maybee et al. | |
| 2018/0241848 A1* | 8/2018 | Walls | G06F 9/45558 |
| 2018/0253335 A1* | 9/2018 | Bishop | G06F 9/505 |
| 2018/0302340 A1* | 10/2018 | Alvarez Callau | G06F 9/5061 |
| 2019/0182323 A1 | 6/2019 | Srinivasan et al. | |
| 2019/0227911 A1* | 7/2019 | Raviv | G06F 11/364 |
| 2020/0005136 A1* | 1/2020 | Spryn | G06N 20/00 |
| 2020/0236168 A1* | 7/2020 | Todd | H04L 67/1097 |
| 2020/0285535 A1* | 9/2020 | Purushothaman | G06F 11/0793 |
| 2020/0296008 A1* | 9/2020 | Savov | H04L 47/70 |
| 2021/0126838 A1* | 4/2021 | Russell | H04L 41/22 |
| 2021/0157583 A1* | 5/2021 | Yuile | G06F 16/1734 |
| 2021/0184985 A1* | 6/2021 | Pulier | H04L 47/70 |

OTHER PUBLICATIONS

Title: Migrating to cloud-native architectures using microservices: an experience report, author: A Balalaie, published on 2015.*

Migrating legacy software to the cloud with ARTIST author: A Bergmayr et al, published on 2013; source: IEEE.*

Clouns—a cloud-native application reference model for enterprise architects, author N Kratzke et al, published on 2016.*

Experimental evaluation of the cloud-native application design, author: S Brunner et al, published on 2015.*

Microservices architecture enables devops: Migration to a cloud-native architecture, author: A Balalaie et al, published on 2016.*

Title: Accelerated learning from recommender systems using multi-armed bandit, author: M Hejazinia,, Published on 2019.*

Title: Multi-armed bandit problems with dependent arms, author: S Pandey, published on 2007.*

Ahmad et al., "A Framework for Architecture-driven Migration of Legacy Systems to Cloud-enabled Software," Proceedings of the WICSA 2014 Companion Volume (WICSA '14 Companion), Article 7, 8 pages.

Jain et al., "Modernization of Legacy Systems: A Generalised Roadmap," Proceedings of the Sixth International Conference on Computer and Communication Technology 2015 (ICCCT '15), 6 pages.

Mell et al., "The NIST Definition of Cloud Computing," Recommendations of the National Institute of Standards and Technology, NIST Special Publication 800-145, Sep. 2011, 7 pages.

* cited by examiner

TRANSFORMATION OF AN ENTERPRISE APPLICATION INTO A CLOUD NATIVE APPLICATION

BACKGROUND

The subject disclosure relates to transforming an application into a cloud native application, and more specifically, to transforming an enterprise application into a cloud native container.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate transformation of an enterprise application into a cloud native container are described.

According to an embodiment, a system can comprise a memory that stores computer executable components and a processor that executes the computer executable components stored in the memory. The computer executable components can comprise an analysis component that employs a model to discover attributes of an enterprise application. The computer executable components can further comprise a transformation component that generates artifacts based on the attributes to transform the enterprise application into a cloud native container.

According to another embodiment, a computer-implemented method can comprise employing, by a system operatively coupled to a processor, a model to discover attributes of an enterprise application. The computer-implemented method can further comprise generating, by the system, artifacts based on the attributes to transform the enterprise application into a cloud native container.

According to another embodiment, a computer program product facilitating a process to transform an enterprise application into a cloud native container is provided. The computer program product comprising a computer readable storage medium having program instructions embodied therewith, the program instructions executable by a processor to cause the processor to employ, by the processor, a model to discover attributes of an enterprise application. The program instructions are further executable by the processor to cause the processor to generate, by the processor, artifacts based on the attributes to transform the enterprise application into a cloud native container.

DETAILED DESCRIPTION

Figure 1:
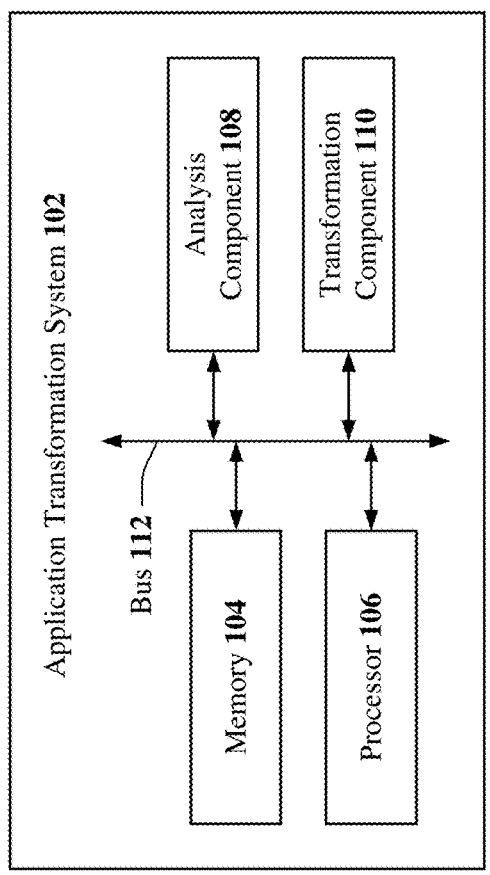
FIG. 1 illustrates a block diagram of an example, non-limiting system that can facilitate transformation of an enterprise application into a cloud native container in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Some existing technologies that facilitate transforming, migrating, deploying, and/or running an application (e.g., a non-cloud application, a legacy application, a classical computing application, etc.) in a cloud computing environment involve performing steps including, but not limited to, one or more of the following: a) pre-defining and creating application connector types that a legacy application can use to expose application programming interfaces (APIs); b) enabling a particular application that is configured to store state information in the cloud computing system, exposing service specifications and ports; c) lifting-and-shifting discovery of infrastructure and applications hosted to automatically generate service-catalog entries for discovered service; and/or d) generating a development operations (DevOps) application deployment package for a deployment tool and executing the deployment, targeting applications with a DevOps service model.

A problem with such existing technologies is that they do not address the full lifecycle of artificial intelligence (AI) driven analysis, testing, and/or continuous integration and continuous deployment (CI/CD) automation to quickly guide an application owner through an application transformation (e.g., a legacy enterprise application to native application transformation). Another problem with such technologies is that they involve manually-driven transformation methods and they do not provide specific and/or targeted insights on an enterprise application as an application owner faces issues occurring at each stage of the transformation.

Given the problems described above with such existing technologies, the present disclosure can be implemented to produce a solution to these problems in the form of systems, computer-implemented methods, and/or computer program products that can facilitate: a) legacy application transformation to cloud native runnable containers through CI/CD generation and error diagnosis; b) a multi-factor analysis to determine application cloud readiness, benefits, and modernization complexity; c) operators planning and orchestration to address legacy application non-functional criteria (also referred to herein as nonfunctional criteria) in cloud native; and/or d) dataflow discovery for data modernization.

FIG. 1 illustrates a block diagram of an example, non-limiting system 100 that can facilitate transformation of an enterprise application into a cloud native container in accordance with one or more embodiments described herein. System 100 can comprise an application transformation system 102, which can be associated with a cloud computing environment. For example, application transformation system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

Application transformation system 102 and/or components thereof (e.g., analysis component 108, transformation component 110, etc.) can employ one or more computing resources of cloud computing environment 950 described below with reference to FIG. 9 and/or one or more functional abstraction layers (e.g., quantum software, etc.) described below with reference to FIG. 10 to execute one or more operations in accordance with one or more embodiments of the subject disclosure described herein. For example, cloud computing environment 950 and/or such one or more functional abstraction layers can comprise one or more classical computing devices (e.g., classical computer, classical processor, virtual machine, server, etc.), quantum hardware, and/or quantum software (e.g., quantum computing device, quantum computer, quantum processor, quantum circuit simulation software, superconducting circuit, etc.) that can be employed by application transformation system 102 and/or components thereof to execute one or more operations in accordance with one or more embodiments of the subject disclosure described herein. For instance, application transformation system 102 and/or components thereof can employ such one or more classical and/or quantum computing resources to execute one or more classical and/or quantum: mathematical function, calculation, and/or equation; computing and/or processing script; algorithm; model (e.g., artificial intelligence (AI) model, machine learning (ML) model, etc.); and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Application transformation system 102 can comprise a memory 104, a processor 106, an analysis component 108, a transformation component 110, and/or a bus 112.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or application transformation system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1 or other figures disclosed herein.

Memory 104 can store one or more computer and/or machine readable, writable, and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to application transformation system 102, analysis component 108, transformation component 110, and/or another component associated with application transformation system 102 as described herein with or without reference to the various figures of the subject disclosure.

Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any embodiments of the subject disclosure.

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 814 and FIG. 8. Such examples of processor 106 can be employed to implement any embodiments of the subject disclosure.

Application transformation system 102, memory 104, processor 106, analysis component 108, transformation component 110, and/or another component of application transformation system 102 as described herein can be communicatively, electrically, operatively, and/or optically coupled to one another via a bus 112 to perform functions of system 100, application transformation system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 818 and FIG. 8. Such examples of bus 112 can be employed to implement any embodiments of the subject disclosure.

Application transformation system 102 can comprise any type of component, machine, device, facility, apparatus, and/or instrument that comprises a processor and/or can be capable of effective and/or operative communication with a wired and/or wireless network. All such embodiments are envisioned. For example, application transformation system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Application transformation system 102 can be coupled (e.g., communicatively, electrically, operatively, optically, etc.) to one or more external systems, sources, and/or devices (e.g., classical and/or quantum computing devices, communication devices, etc.) via a data cable (e.g., High-Definition Multimedia Interface (HDMI), recommended standard (RS) 232, Ethernet cable, etc.). In some embodiments, application transformation system 102 can be coupled (e.g., communicatively, electrically, operatively, optically, etc.) to one or more external systems, sources, and/or devices (e.g., classical and/or quantum computing devices, communication devices, etc.) via a network.

In some embodiments, such a network can comprise wired and wireless networks, including, but not limited to, a cellular network, a wide area network (WAN) (e.g., the Internet) or a local area network (LAN). For example, application transformation system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, application transformation system 102 can thus include hardware (e.g., a central processing unit (CPU), a transceiver, a decoder, quantum hardware, a quantum processor, etc.), software (e.g., a set of threads, a set of processes, software in execution, quantum pulse schedule, quantum circuit, quantum gates, etc.) or a combination of hardware and software that facilitates communicating information between application transformation system 102 and external systems, sources, and/or devices (e.g., computing devices, communication devices, etc.).

Application transformation system 102 can comprise one or more computer and/or machine readable, writable, and/or executable components and/or instructions that, when executed by processor 106 (e.g., a classical processor, a quantum processor, etc.), can facilitate performance of operations defined by such component(s) and/or instruction(s). Further, in numerous embodiments, any component associated with application transformation system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, analysis component 108, transformation component 110, and/or any other components associated with application transformation system 102 as disclosed herein (e.g., communicatively, electronically, operatively, and/or optically coupled with and/or employed by application transformation system 102), can comprise such computer and/or machine readable, writable, and/or executable component(s) and/or instruction(s). Consequently, according to numerous embodiments, application transformation system 102 and/or any components associated therewith as disclosed herein, can employ processor 106 to execute such computer and/or machine readable, writable, and/or executable component(s) and/or instruction(s) to facilitate performance of one or more operations described herein with reference to application transformation system 102 and/or any such components associated therewith.

Application transformation system 102 can facilitate (e.g., via processor 106) performance of operations executed by and/or associated with analysis component 108, transformation component 110, and/or another component associated with application transformation system 102 as disclosed herein. For example, as described in detail below, application transformation system 102 can facilitate via processor 106 (e.g., a classical processor, a quantum processor, etc.): employing a model to discover attributes of an enterprise application; and/or generating artifacts based on the attributes to transform the enterprise application into a cloud native container. In this example, the artifacts can be selected from a group consisting of one or more: development artifacts, build artifacts, deployment artifacts, operations artifacts, and continuous integration and continuous deployment artifacts.

In another example, as described in detail below, application transformation system 102 can further facilitate via processor 106 (e.g., a classical processor, a quantum processor, etc.): performing assessments of the cloud native container prior to runtime and at runtime to determine at least one of application cloud native readiness, application cost to benefit, or application modernization strategy; identifying an error in at least one of the attributes of the enterprise application or the artifacts and generating one or more modified artifacts based on the error, thereby facilitating at least one of reduced application transformation time, improved processing efficiency of the processor, or reduced computational costs of the processor; generating one or more modified artifacts based on an error identified in at least one of the attributes of the enterprise application or the artifacts and recommending one or more application modernization strategies corresponding to the enterprise application based on the one or more modified artifacts; planning one or more operators to satisfy one or more nonfunctional criteria of the enterprise application in the cloud native container and orchestrating the one or more operators to satisfy the one or more nonfunctional criteria of the enterprise application in the cloud native container; and/or constructing a dataflow corresponding to the enterprise application to support transformation of the enterprise application to the cloud native container. In this example, the artifacts can be selected from a group consisting of one or more: development artifacts, build artifacts, deployment artifacts, operations artifacts, and continuous integration and continuous deployment artifacts.

Analysis component 108 can employ a model to discover attributes of an enterprise application. For example, analysis component 108 can employ a machine learning (ML) model based on artificial intelligence (AI) and natural language processing (NLP) and/or named-entity recognition (NER), including, but not limited to, a shallow or deep neural network model, a support vector machine (SVM) model, a decision tree classifier, or any supervised or unsupervised machine learning model that can facilitate discovery of attributes of an enterprise application. Analysis component 108 can employ such a model defined above to discover attributes of an enterprise application including, but not limited to, application classes, build, configuration and properties, data dependencies, library dependencies, resource dependencies, data processes (e.g., file, storage, cache, queue, log, database, etc.), and/or another attribute of an enterprise application. In an example, such an enterprise application can comprise a polyglot application (e.g., Java 2 Platform Enterprise Edition (J2EE), etc.), a packaged application (e.g., Systems, Applications and Products (SAP), etc.), and/or another enterprise application.

Analysis component 108 can employ such a model to discover such attributes in data sources comprising information technology (IT) documents including, but not limited to, tickets, logs, git issues, and/or other IT documents. In some embodiments, such IT documents can be input to application transformation system 102 using, for instance, an interface component of application transformation system 102 (not depicted in the FIG. 1), such as an application programming interface (API), a representational state transfer (REST) API, a graphical user interface (GUI), and/or another interface component.

In an example, analysis component 108 can employ a model to discover attributes of an enterprise application by discovering domain-specific rules of the enterprise application (e.g., using IT document(s) defined above). For example, analysis component 108 can employ a model defined above to discover domain-specific rules of an enterprise application by executing the following process: a) learn pure part-of-speech (POS) tags for words in IT documents using a probabilistic context free grammar (PCFG); b) learn key concepts that could be n-grams (e.g., single or multi worded concepts); c) based on the concepts learned, generate directed phrases where a left directed phrase indicates words to the left of a concept and a right directed phrase indicates words to the right of a concept; d) abstract the phrases by representing them in terms of a parse tree where words in the phrases are associated with POS tags or a concept; e) apply PCFG to generate rules in terms of POS tags; g) shorten the rules by applying a string compression method and reduce the overall number of rules generated; h. generate adapter grammar rules by selecting top-K rules among the rules generated; and i) use the rules to generate instances from IT documents to application discovery, analytics, and automation.

In another example, analysis component 108 can employ a model to discover attributes of an enterprise application by separating configuration and non-functional (nonfunctional) dependencies (e.g., session persistence) from application computation logic of the enterprise application. For example, analysis component 108 can apply a model-driven approach, such as the model-driven process described above and/or one or more ML models defined above to separate configuration and non-functional dependencies from application computation logic of an enterprise application.

Transformation component 110 can generate artifacts based on attributes of an enterprise application to transform the enterprise application into a cloud native container. For example, based on the attributes of an enterprise application that can be discovered by analysis component 108 as described above, transformation component 110 can generate artifacts (e.g., scripts, code, etc.) to transform the enterprise application into a cloud native container. For instance, based on such attributes, transformation component 110 can generate artifacts including, but not limited to, one or more: development artifacts, build artifacts, deployment artifacts, operations artifacts, continuous integration and continuous deployment (CI/CD) artifacts, and/or another artifact that can facilitate transformation (e.g., by transformation component 110) of the enterprise application into a cloud native container.

In an example, based on (e.g., using) the attributes of an enterprise application that can be discovered by analysis component 108 as described above, transformation component 110 can generate runnable development and operations (DevOps) artifacts (e.g., dockerfile, CI/CD build files, CI/CD deploy files, secrets, yaml, etc.) to facilitate build and deploy in a cloud native environment. For instance, based on the configuration and non-functional dependencies (e.g., session persistence) that can be separated by analysis component 108 from application computation logic of an enterprise application as described above, transformation component 110 can generate runnable development and operations (DevOps) artifacts (e.g., dockerfile, CI/CD build files, CI/CD deploy files, secrets, yaml, etc.) to facilitate build and deploy in a cloud native environment.

Based on discovery of such attributes of an enterprise application by analysis component 108 and/or generation of such artifacts by transformation component 110 to transform the enterprise application into a cloud native container as described above, analysis component 108 can identify one or more errors in at least one of the attributes of the enterprise application or the artifacts. To facilitate identification of such an error(s), analysis component 108 can employ one or more of the models defined above to analyze build, deploy, and operations logs, as well as test reports to identify gaps in the discovered attributes of the enterprise application or the generated artifacts. For example, analysis component 108 can employ an intent classifier, a bidirectional long short-term memory (LSTM) with a conditional random field (CRF) layer (BI-LSTM-CRF), a machine learning (ML) model based on artificial intelligence (AI), natural language processing (NLP), and/or named-entity recognition (NER) to analyze build, deploy, and operations logs, as well as test reports to identify gaps in the discovered attributes of the enterprise application or the generated artifacts.

In an example, analysis component 108 can employ an intent classifier and a BI-LSTM-CRF to analyze build, deploy, and operations logs, as well as test reports to identify gaps in discovered configuration and dependencies of the enterprise application. For instance, based on a certain error log message, analysis component 108 can employ a supervised classification approach to identify intent of the error log message and/or to predict concepts and their instances. For example, analysis component 108 can employ a supervised classification approach to identify the type of the error, the nature of the error, and/or the target entity. In an example, analysis component 108 can employ an intent classifier model that has been trained using Bi-LSTM-CRF to extract from a certain error log message the type, nature, and/or target entity.

Transformation component 110 can generate one or more modified artifacts based on the one or more errors identified by analysis component 108 as described above. For example, based on one or more errors identified by analysis component 108 in the artifacts generated by transformation component 110, transformation component 110 can generate one or more modified artifacts to replace and/or correct such erroneous artifacts. For instance, based on one or more errors identified by analysis component 108 in the artifacts generated by transformation component 110, transformation component 110 can map one or more of the entities extracted from a certain error log message to one or more solutions of a solution knowledge graph comprising solutions that can be implemented to address the error. In this example, transformation component 110 can utilize the one or more solutions to generate one or more modified artifacts.

Based on generation of such one or more modified artifacts by transformation component 110 as described above, transformation component 110 can further recommend one or more application modernization strategies (e.g., to inform owner of enterprise application and/or accelerate transformation of the enterprise application to a cloud native container). In an example, transformation component 110 can recommend one or more application modernization strategies corresponding to the enterprise application. In another example, transformation component 110 can recommend modifications to application computation logic corresponding to the enterprise application. In another example, transformation component 110 can recommend modifications to application computation logic, configuration and property extraction, service innovation, and/or DevOps artifact specifications.

Transformation component 110 can plan and orchestrate one or more operators to satisfy one or more non-functional criteria (also referred to herein as nonfunctional criteria) of the enterprise application in the cloud native container. For example, transformation component 110 can plan and orchestrate one or more operators to satisfy (e.g., address, cope with, etc.) non-functional criteria including, but not limited to: session persistence; backing services; state management; atomicity, consistency, isolation, and durability (ACID) properties of data transactions; and/or another non-functional criteria of the enterprise application in the cloud native container. Cloud-native applications are generally stateless, meaning they do not keep processing or data information in the event of a crash or reboot. Cloud-native applications also do not guarantee synchronization with other services or datastores (e.g., if a data object is modified in one place, copies of such a data object located elsewhere may not be updated). Both of these attributes are important for an enterprise workload, such as a J2EE enterprise workload, and therefore, transformation component 110 can utilize a composed set of operators to handle such constraints (e.g., making sure processing states are persisted outside the application on persistent storage; making sure data object updates are propagated to replicas to ensure ACID property of transactions, etc.).

Analysis component 108 can perform assessments of the enterprise application and/or the cloud native container prior to runtime and/or at runtime to determine at least one of application cloud native readiness, application cost to benefit, or application modernization strategy. In an example, analysis component 108 can perform a pre-flight (e.g., prior to runtime) multi-factor analysis of the enterprise application and/or the cloud native container to determine at least one of application cloud native readiness, application cost to benefit, or application modernization strategy. In another example, analysis component 108 can perform a pre-flight (e.g., prior to runtime) multi-factor analysis and/or an in-flight (e.g., at runtime) multi-factor analysis of the cloud native container to determine at least one of application cloud native readiness, application cost to benefit, or application modernization strategy. As referenced herein, pre-flight analysis is an assessment of application artifacts (e.g., codebase, deployment scripts, etc.) that can be performed without observing the runtime behavior of the application (e.g., the cloud native container) and in-flight analysis is an assessment of a running application (e.g., the cloud native container) to observe its behaviors (e.g., communication and/or call pattern, load, data and/or disk utilization, exception handling, etc.).

To facilitate such pre-flight and/or in-flight multi-factor analysis of the enterprise application and/or the cloud native container as described above, analysis component 108 can employ a rule-based and/or template-driven approach using, for instance, a checklist as described below to perform such analysis (e.g., using checklist 500a and/or checklist 500b described below and illustrated in FIG. 5). For example, analysis component 108 can employ a rule-based and/or template-driven methodology (e.g., using a checklist) to conduct a pre-flight multi-factor analysis of an enterprise application to assess cloud native readiness and/or to map findings to recommendations on application modernization strategies (e.g., one or more of the application modernization strategies described above). In another example, analysis component 108 can employ a rule-based and/or template-driven methodology (e.g., using a checklist) to conduct a pre-flight and an in-flight multi-factor analysis of a transformed enterprise application (e.g., the cloud native container) to assess cloud native readiness and/or to map findings to recommendations on application modernization strategies. In some embodiments, analysis component 108 can employ checklist 500a and/or checklist 500b described below and illustrated in FIG. 5 to conduct a pre-flight and/or an in-flight multi-factor analysis, respectively, of a transformed enterprise application (e.g., the cloud native container) to assess cloud native readiness and/or to map findings to recommendations on application modernization strategies.

Transformation component 110 can construct a dataflow corresponding to an enterprise application to support transformation of the enterprise application to a cloud native container. In an example, transformation component 110 can discover and/or construct one or more dataflows of an enterprise application using data tainting (e.g., also referred to as taint checking) and/or runtime tracking. In this example, transformation component 110 can increase data flow coverage using multi-armed bandits learning. The resulting dataflow can be used to enhance application configuration and data dependency discovery, inform constraints and criteria on application refactoring, and support test case generations.

Figure 2:
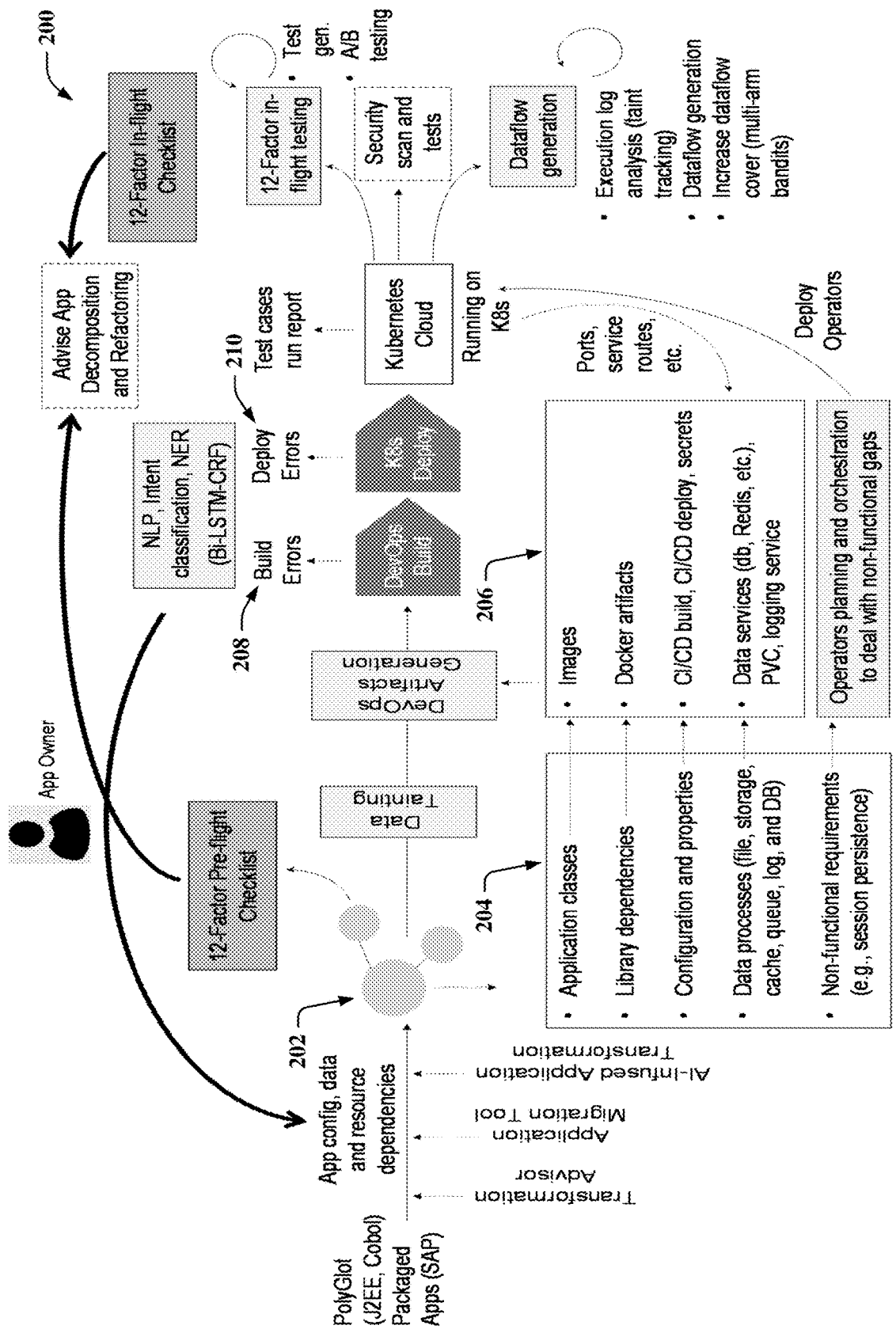
FIG. 2 illustrates a diagram of an example, non-limiting system that can facilitate transformation of an enterprise application into a cloud native container in accordance with one or more embodiments described herein.

FIG. 2 illustrates a diagram of an example, non-limiting system 200 that can facilitate transformation of an enterprise application into a cloud native container in accordance with one or more embodiments described herein. Repetitive description of like elements and/or processes employed in respective embodiments is omitted for sake of brevity.

As described above with reference to FIG. 1, analysis component 108 can discover and/or separate attributes of an enterprise application 202 (e.g., polyglot application, packaged application, etc.) to obtain attributes 204 depicted in FIG. 2 (e.g., application classes, library dependencies, configuration and properties, etc.). Based on such attributes 204, transformation component 110 can generate artifacts 206 comprising DevOps artifacts (e.g., images, docker artifacts, CI/CD build, CI/CD deploy, etc.) illustrated in FIG. 2 that can facilitate transformation of enterprise application 202 into a cloud native container as described above with reference to FIG. 1. As illustrated in FIG. 2 and described above with reference to FIG. 1, analysis component 108 can separate one or more non-functional criteria of enterprise application 202 (e.g., session persistence, etc.) and transformation component 110 can plan and orchestrate (e.g., deploy) one or more operators to satisfy such one or more non-functional criteria of enterprise application 202 in a cloud native environment (e.g., Kubernetes Cloud, K8s, etc.).

Analysis component 108 can perform a pre-flight (e.g., prior to runtime) multi-factor analysis (denoted as 12-factor pre-flight checklist in FIG. 2) of enterprise application 202 to determine at least one of application cloud native readiness, application cost to benefit, or application modernization strategy. Additionally, or alternatively, analysis component 108 can perform a pre-flight (e.g., prior to runtime) and/or an in-flight (e.g., at runtime) assessment on artifacts 206 to determine at least one of application cloud native readiness, application cost to benefit, or application modernization strategy. For example, analysis component 108 can perform a pre-flight (e.g., prior to runtime) and/or an in-flight (e.g., at runtime) assessment on artifacts 206 to identify one or more build errors 208 and/or deploy errors 210 using, for instance, NLP, intent classification, NER, and/or Bi-LSTM-CRF as illustrated in FIG. 2 and described above with reference to FIG. 1. Build errors 208 and/or deploy errors 210 can be provided (e.g., via an API, GUI, REST API, etc.) to an owner of enterprise application 202 to facilitate modification of enterprise application 202 to address such error(s).

As described above with reference to FIG. 1, based on running artifacts 206 in a cloud native environment (denoted as Kubernetes Cloud and K8s in FIG. 2), analysis component 108 can perform an in-flight (e.g., at runtime) multi-factor analysis (denoted as 12-factor in-flight testing in FIG. 2). For example, analysis component 108 can perform A/B testing and/or test generation (test gen.) as depicted in FIG. 2 by creating test data and/or test cases to test the adequacy (e.g., correctness, fidelity, effectiveness, etc.) of artifacts 206 running in a cloud native environment.

As described above with reference to FIG. 1, based on running artifacts 206 in a cloud native environment (denoted as Kubernetes Cloud and K8s in FIG. 2), analysis component 108 can generate one or more dataflows to determine the data lifecycle occurring in the application (e.g., enterprise application 202 and/or the cloud native container comprising artifacts 206). For example, as illustrated in FIG. 2 and described above with reference to FIG. 1, transformation component 110 can discover and/or construct one or more dataflows of enterprise application 202 using data tainting (denoted as execution log analysis (taint tracking) in FIG. 2). In this example, transformation component 110 can increase dataflow coverage using multi-armed bandits learning. The resulting dataflow can be used to enhance application configuration and data dependency discovery, inform constraints and criteria on application refactoring, and support test case generations.

Figure 3:
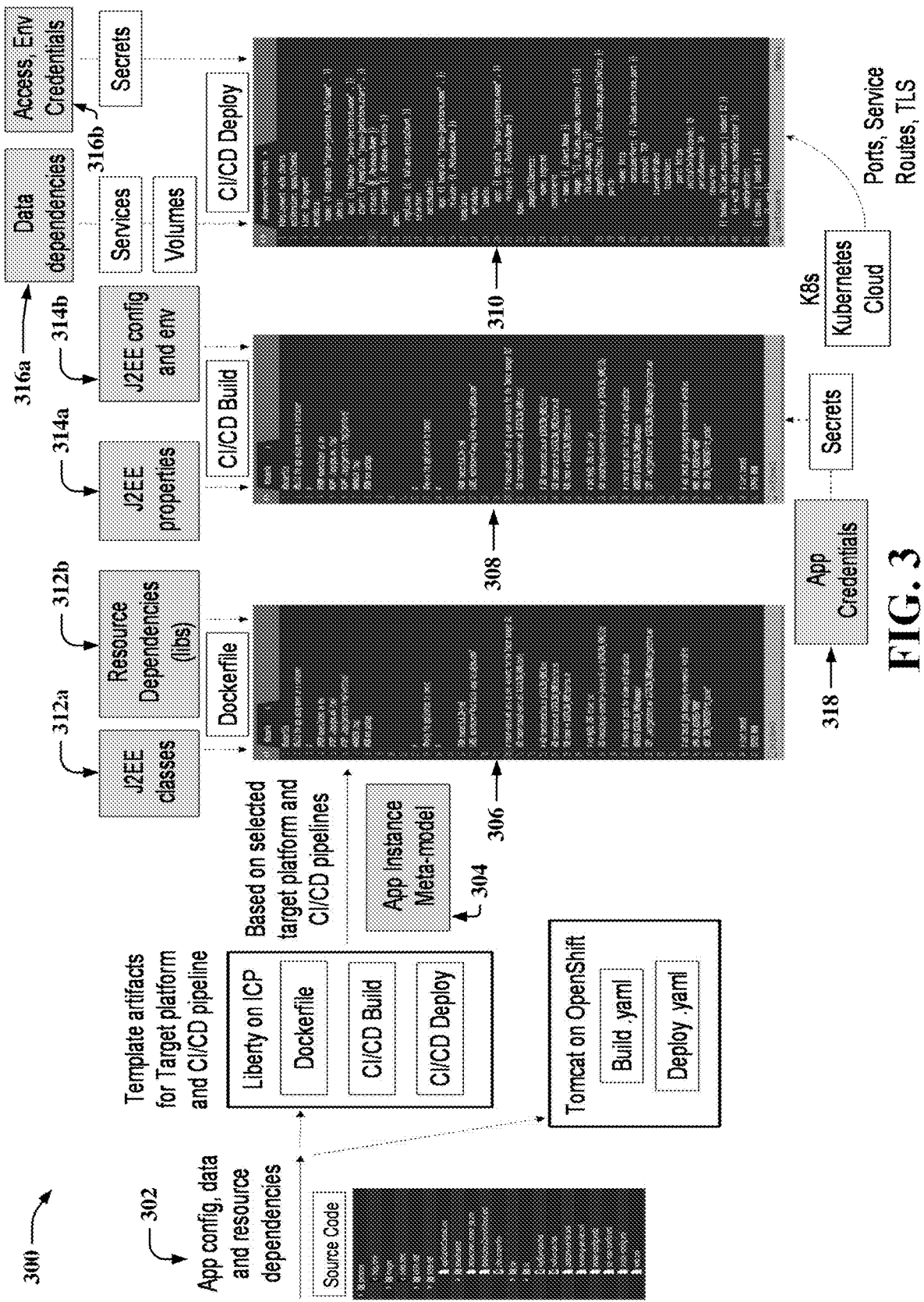
FIG. 3 illustrates a diagram of an example, non-limiting system that can facilitate transformation of an enterprise application into a cloud native container in accordance with one or more embodiments described herein.

FIG. 3 illustrates a diagram of an example, non-limiting system 300 that can facilitate transformation of an enterprise application into a cloud native container in accordance with one or more embodiments described herein. Repetitive description of like elements and/or processes employed in respective embodiments is omitted for sake of brevity.

System 300 can comprise a visual representation of DevOps artifact generation that can be performed by transformation component 110 as described above with reference to FIGS. 1 and 2. In some embodiments, system 300 can comprise a meta-model driven based on templates.

As described above with reference to FIGS. 1 and 2, analysis component 108 can discover attributes 302 of an enterprise application that can comprise application configuration data and resource dependencies (denoted app. config. data and resource dependencies in FIG. 2). In an example, analysis component 108 can discover attributes 302 in source code of the enterprise application as depicted in FIG. 3.

Based on such attributes 302, as well as a selected target platform and CI/CD pipelines as depicted in FIG. 3, transformation component 110 can generate an application instance meta-model 304 comprising artifacts 306, 308, 310, which can comprise scripts as depicted in FIG. 3. Artifacts 306 and/or 308 can comprise build artifacts such as, for example, dockerfile and/or CI/CD build scripts. Artifacts 310 can comprise deployment artifacts such as, for example, CI/CD deploy scripts.

Transformation component 110 can extrapolate and embed properties 312a, 312b, 314a, 314b, 316a, 316b into artifacts 306, 308, 310, where properties 312a, 312b, 314a, 314b, 316a, 316b can comprise some of attributes 302 that can be discovered and/or separated from an enterprise application by analysis component 108 as described above.

For example, transformation component 110 can extrapolate and embed properties 312a, 312b into artifacts 306 as depicted in FIG. 3. In another example, transformation component 110 can extrapolate and embed properties 314a, 314b into artifacts 308 as depicted in FIG. 3. In another example, transformation component 110 can extrapolate and embed properties 316a, 316b into artifacts 310 as depicted in FIG. 3. In some embodiments, transformation component 110 can further extrapolate and embed application credentials 318 (e.g., secrets) and/or access and environment credentials of properties 316b into artifacts 308 and 310, respectively, as depicted in FIG. 3.

Transformation component 110 can further create services (e.g., data services for persistence) and/or mount volumes in artifacts 310 as depicted in FIG. 3. In some embodiments, transformation component 110 can create service routes, port mappings (ports), and/or service names in artifacts 310 based on target environment specification and ingress criteria of the application classes as depicted in FIG. 3.

Figure 4:
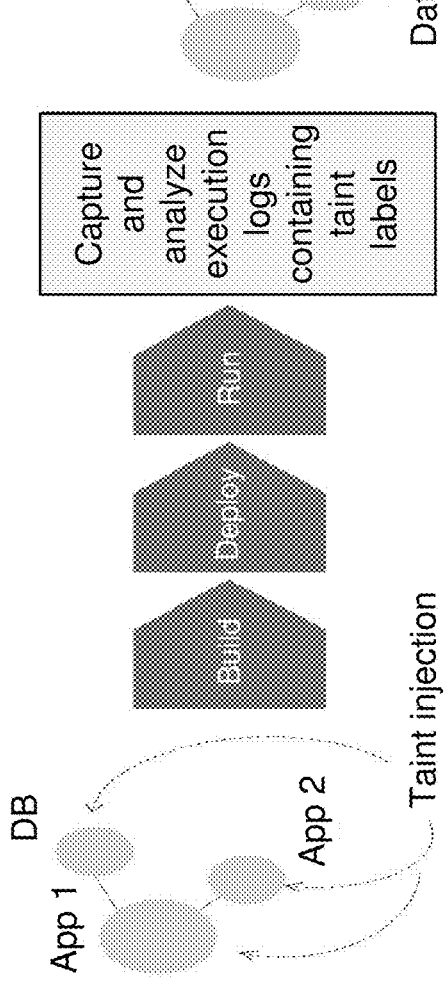
FIG. 4 illustrates a diagram of an example, non-limiting system that can facilitate transformation of an enterprise application into a cloud native container in accordance with one or more embodiments described herein.

FIG. 4 illustrates a diagram of an example, non-limiting system 400 that can facilitate transformation of an enterprise application into a cloud native container in accordance with one or more embodiments described herein. Repetitive description of like elements and/or processes employed in respective embodiments is omitted for sake of brevity.

System 400 illustrates a data tainting approach that application transformation system 102 (e.g., via analysis component 108, transformation component 110, etc.) can utilize to construct partial dataflows across application components and services. For example, system 400 illustrates a data tainting approach that application transformation system 102 (e.g., via analysis component 108, transformation component 110, etc.) can utilize as described below to generate and/or optimize data test cases corresponding to an enterprise application (e.g., test cases that are incomplete and/or cannot be adopted to test different services) by employing a multi-parameter optimization problem such as, for instance, a multi-arm bandit problem to improve dataflow coverage of the application. As referenced herein, such a data tainting approach can comprise executing an application such as, for instance, an enterprise application using tainted parameters (e.g., tainted data and/or tainted code) that can be flagged as tainted (e.g., using taint labels) and/or tracked during runtime (e.g., via execution logs) as various operations of the enterprise application are executed using such tainted parameters, thereby enabling identification of one or more dataflows and/or dependencies across application components and services of the enterprise application.

As described below, system 400 illustrates how application transformation system 102 (e.g., via analysis component 108, transformation component 110, etc.) can employ a multi-parameter optimization problem such as, for example, a multi-arm bandit problem to construct a dataflow corresponding to an enterprise application to support transformation of the enterprise application to the cloud native container. For example, as described below, system 400 illustrates how application transformation system 102 (e.g., via analysis component 108, transformation component 110, etc.) can employ a multi-arm bandit problem, along with a first enterprise application (denoted as App1 in FIG. 4), a second enterprise application (denoted as App 2 in FIG. 4), and/or a database (denoted as DB in FIG. 4) to facilitate taint injection and generate build, deploy, and run artifacts (e.g., scripts) to capture and analyze execution logs containing taint labels and thereby construct a dataflow and dependencies. In this example, such build, deploy, and run artifacts can comprise data test cases of the enterprise application and/or optimized data test cases that can be used by application transformation system 102 (e.g., via analysis component 108, transformation component 110, etc.) to test a transformed enterprise application (e.g., a cloud native container).

In a multi-arm bandit problem, an entity such as, for example, application transformation system 102 (e.g., via analysis component 108, transformation component 110, etc.) can choose between multiple actions (e.g., trying different paths) each with unknown payout. The goal is to determine the best or more profitable outcome through a series of choices. In an example, as illustrated by system 400 depicted in FIG. 4, application transformation system 102 (e.g., via analysis component 108, transformation component 110, etc.) can employ a multi-arm bandit problem to generate and execute various data test cases (e.g., the build, deploy, and run artifacts denoted in FIG. 4) using various tainted parameters (e.g., tainted data and/or tainted code) to determine how the tainted parameters flow through an enterprise application by identifying application components and services affected by the tainted parameters (e.g., by identifying in execution logs the taint labels corresponding to the tainted parameters as denoted in FIG. 4). In this example, by identifying application components and services affected by various tainted parameters used to execute various data test cases, application transformation system 102 (e.g., via analysis component 108, transformation component 110, etc.) can generate (e.g., construct) various dataflows (e.g., partial dataflows) that illustrate how the respective various tainted parameters flow through the enterprise application. In this example, by employing a multi-arm bandit problem to generate and execute the various data test cases using the various tainted parameters, application transformation system 102 (e.g., via analysis component 108, transformation component 110, etc.) can determine which of the various data test cases and/or the various tainted parameters affect the most number of components and/or services of an enterprise application. In this example, the various data test cases that affect the most number of components and/or services can comprise optimized data test cases that can be employed by application transformation system 102 to test a transformed enterprise application (e.g., to test the cloud native container described herein).

Figure 5:
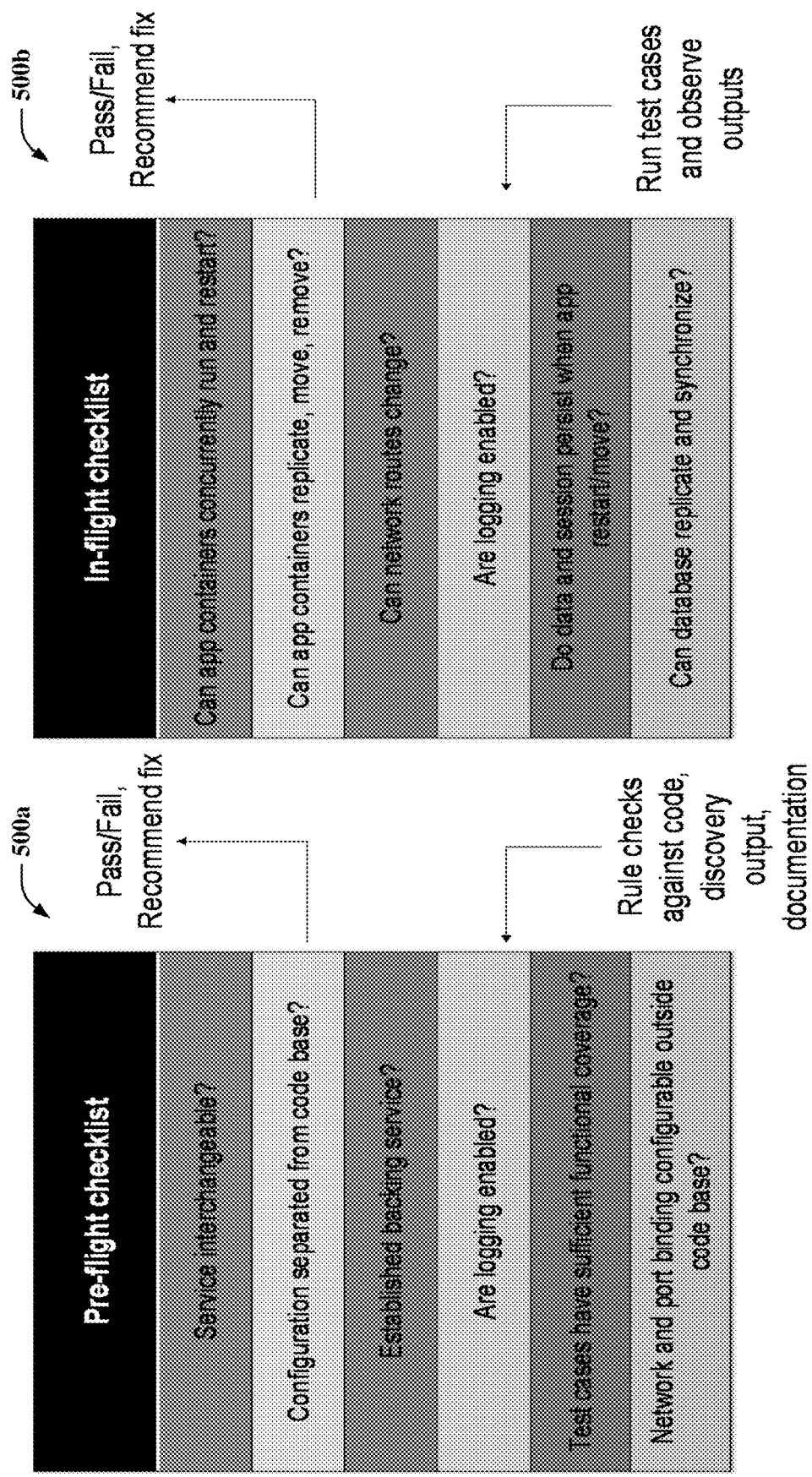
FIG. 5 illustrates a diagram of example, non-limiting checklists that can facilitate transformation of an enterprise application into a cloud native container in accordance with one or more embodiments described herein.

FIG. 5 illustrates a diagram of example, non-limiting checklists 500a and 500b that can, in one example, facilitate transformation of an enterprise application into a cloud native container in accordance with one or more embodiments described herein. Repetitive description of like elements and/or processes employed in respective embodiments is omitted for sake of brevity.

In this example, checklist 500a can comprise a rule-based multi-factor pre-flight checklist that can be employed by analysis component 108 to analyze, for example, configuration of an enterprise application and/or a cloud native container comprising a transformed enterprise application. For instance, based on discovery of attributes of an enterprise application, as well as rule checks against code, and/or other documentation, analysis component 108 can address each question of checklist 500a to determine if, for example, key configuration, data, and/or service dependencies have been established. In this example, depending on the answers to the questions of checklist 500a illustrated in FIG. 5, analysis component 108 and/or transformation component 110 can, for example, modify one or more of the artifacts generated by transformation component 110 and/or recommend one or more application modernization strategies and/or one or more operators criteria as described above with reference to FIG. 1.

Furthermore, in this example, checklist 500b can comprise a test-driven multi-factor pre-flight checklist that can be employed by analysis component 108 to analyze, for example, operational behavior (e.g., operational behavior with respect to data) a cloud native container comprising a transformed enterprise application. For instance, based on the one or more optimized data test cases that can be generated by application transformation system 102 (e.g., via analysis component 108, transformation component 110, etc.) as described above with reference to FIG. 4, analysis component 108 can run such test cases and answer each question of checklist 500b to test, for example, data persistence, session, data synchronization, transactional properties to data services, and/or another feature of a cloud native container comprising a transformed enterprise application. In this example, depending on the answers to the questions of checklist 500b illustrated in FIG. 5, analysis component 108 and/or transformation component 110 can, for example, modify one or more of the artifacts generated by transformation component 110 and/or recommend one or more application modernization strategies and/or one or more operators criteria as described above with reference to FIG. 1.

Figure 6A:
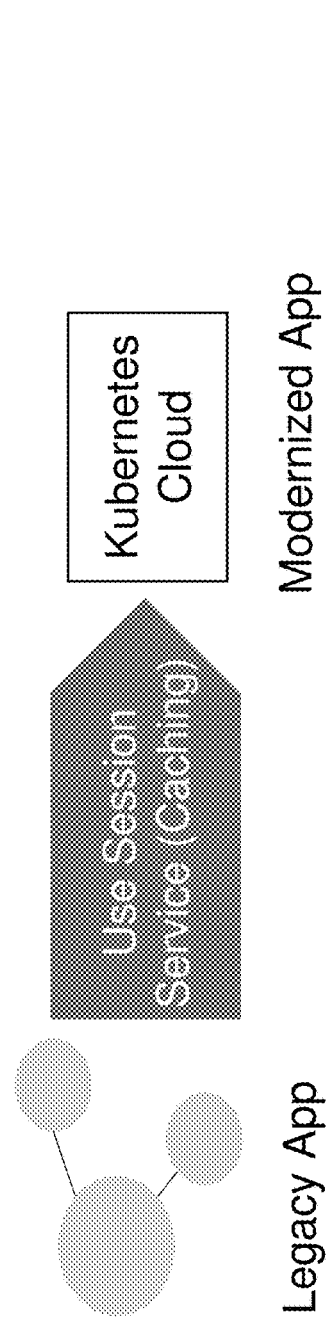
FIGS. 6A and 6B illustrate diagrams of example, non-limiting systems that can facilitate transformation of an enterprise application into a cloud native container in accordance with one or more embodiments described herein.
Figure 6B:
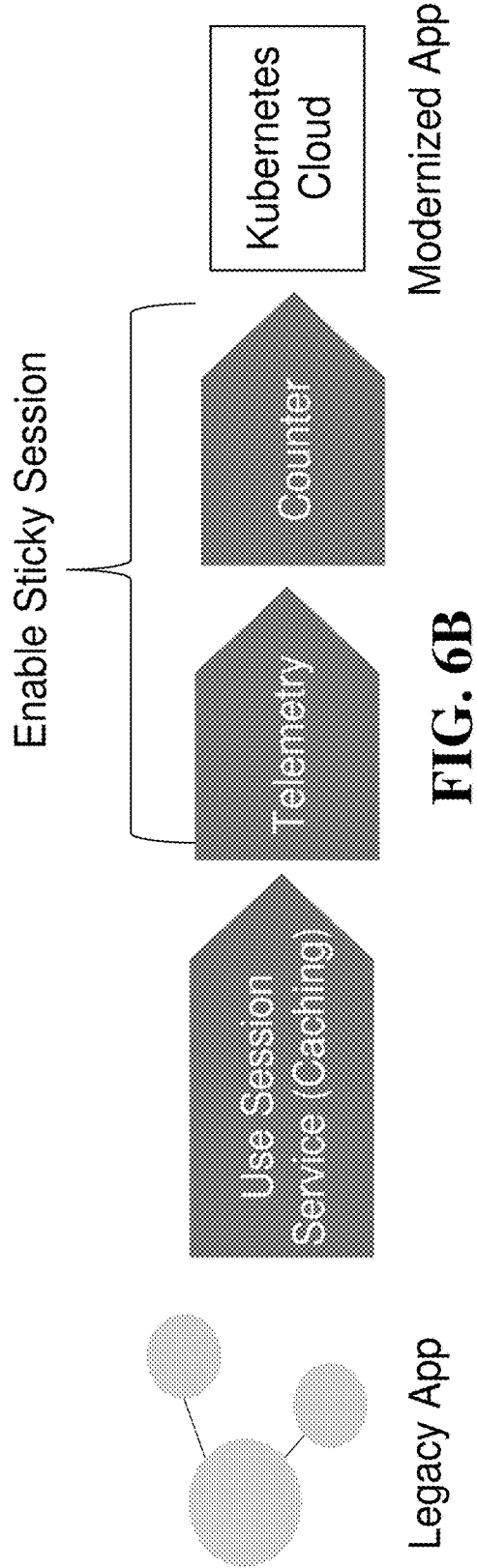

FIGS. 6A and 6B illustrate diagrams of example, non-limiting systems 600a, 600b that can facilitate transformation of an enterprise application into a cloud native container in accordance with one or more embodiments described herein. Repetitive description of like elements and/or processes employed in respective embodiments is omitted for sake of brevity.

Depending on the answers to the questions of checklists 500a, 500b illustrated in FIG. 5, transformation component 110 can plan and orchestrate one or more operators to address one or more problems (e.g., errors, failures, etc.) and/or to satisfy one or more non-functional criteria (also referred to herein as nonfunctional criteria) of the enterprise application in the cloud native container. For example, transformation component 110 can plan and orchestrate one or more operators to address: session persistence; statekeeping and interoperability with legacy data stores; data ACID property and synchronization; and/or another problem and/or no-functional criteria.

In some embodiments, transformation component 110 can implement system 600a and/or system 600b illustrated in FIGS. 6A and 6B, respectively, to plan and orchestrate one or more operators. In an example, transformation component 110 can implement system 600a to transform an enterprise application (denoted as Legacy App in FIG. 6A) to a cloud native container (denoted as Modernized App in FIG. 6A) using session service (e.g., caching) to plan and orchestrate an atomic operator. In another example, transformation component 110 can implement system 600b to transform an enterprise application (denoted as Legacy App in FIG. 6B) to a cloud native container (denoted as Modernized App in FIG. 6B) using session service (e.g., caching), telemetry, and/or counter software to plan and orchestrate a composable operator to address additional criteria for the cloud native container. In this example, as depicted in FIG. 6B, the telemetry and counter software enable sticky session.

In some embodiments, transformation component 110 can employ artificial intelligence (AI), for instance, using a machine learning (ML) model defined above with reference to FIG. 1 to plan and orchestrate one or more operators. In these embodiments, such AI planning offers dual capability.

For example, it can be used to: discover existing operators that can be enabled as part of the execution and/or their sequence; and/or discover "gaps" or criteria for new operators based on the emerging use cases (e.g. when the planner fails and/or given a human input). An embodiment of this work may integrate learning (e.g., through discovery) with on-line planning to dynamically enrich the set of actions (e.g., domain description).

Application transformation system 102 can be associated with various technologies. For example, application transformation system 102 can be associated with application transformation technologies, application programming technologies, cloud native container technologies, cloud native container programming technologies, machine learning technologies, artificial intelligence technologies, cloud computing technologies, and/or other technologies.

Application transformation system 102 can provide technical improvements to systems, devices, components, operational steps, and/or processing steps associated with the various technologies identified above. For example, application transformation system 102 can identify one or more errors in the attributes of an enterprise application or the artifacts generated by application transformation system 102 (e.g., via transformation component 110) based on the attributes to transform the enterprise application into a cloud native container. Based on identifying such error(s), application transformation system 102 can generate one or more modified artifacts and/or recommend one or more application modernization strategies corresponding to the enterprise application based on the one or more modified artifacts. By generating such modified artifact(s) and/or recommending such one or more application modernization strategies to address (e.g., correct) such identified error(s), application transformation system 102 can thereby reduce the amount of time it takes to transform the enterprise application into a cloud native container that operates as intended. For instance, by generating such modified artifact(s) and/or recommending such application modernization strategies to an owner of the enterprise application, application transformation system 102 can thereby facilitate prompt (e.g., immediate) correction of such identified error(s) prior to running the transformed enterprise application in the cloud native environment.

Application transformation system 102 can provide technical improvements to a processing unit (e.g., processor 106) associated with a classical computing device and/or a quantum computing device (e.g., a quantum processor, quantum hardware, superconducting circuit, etc.) associated with application transformation system 102. For example, by reducing the application transformation time and/or facilitating prompt (e.g., immediate) correction of such identified error(s) prior to running the transformed enterprise application in the cloud native environment as described above, application transformation system 102 can reduce the workload of a processor (e.g., processor 106) utilized to execute such transformation of the enterprise application and/or the workload of a processor utilized to run the transformed enterprise application in a cloud native container. Such reduced workload of such processor(s) can improve processing efficiency of such processor(s) and/or reduce computational costs of such processor(s).

A practical application of application transformation system 102 is that it can be implemented by an owner of an enterprise application to quickly and automatically transform the enterprise application into a cloud native container. For example, a practical application of application transformation system 102 is that it can be implemented by an owner of an enterprise application to quickly and automatically transform the enterprise application into a cloud native container without assistance from a human to manually: generate the artifacts described herein; identify and/or correct errors; and/or plan and orchestrate operators to satisfy nonfunctional criteria of the enterprise application in the cloud native container.

It should be appreciated that application transformation system 102 provides a new approach driven by relatively new application transformation technologies that involve human assistance (e.g., from a subject matter expert (SME)) to transform an application (e.g., an enterprise application) into a cloud native container. For example, application transformation system 102 provides a new automated approach to transform an enterprise application into a cloud native container without assistance from a human to manually: generate the artifacts described herein; identify and/or correct errors; and/or plan and orchestrate operators to satisfy nonfunctional criteria of the enterprise application in the cloud native container.

Application transformation system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, etc.) to execute defined tasks related to the various technologies identified above. Application transformation system 102 and/or components thereof, can be employed to solve new problems that arise through advancements in technologies mentioned above, employment of quantum computing systems, cloud computing systems, computer architecture, and/or another technology.

It is to be appreciated that application transformation system 102 can utilize various combinations of electrical components, mechanical components, and circuitry that cannot be replicated in the mind of a human or performed by a human, as the various operations that can be executed by application transformation system 102 and/or components thereof as described herein are operations that are greater than the capability of a human mind. For instance, the amount of data processed, the speed of processing such data, or the types of data processed by application transformation system 102 over a certain period of time can be greater, faster, or different than the amount, speed, or data type that can be processed by a human mind over the same period of time.

According to several embodiments, application transformation system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that application transformation system 102 can include information that is impossible to obtain manually by an entity, such as a human user. For example, the type, amount, and/or variety of information included in application transformation system 102, analysis component 108, and/or transformation component 110 can be more complex than information obtained manually by a human user.

Figure 7A:
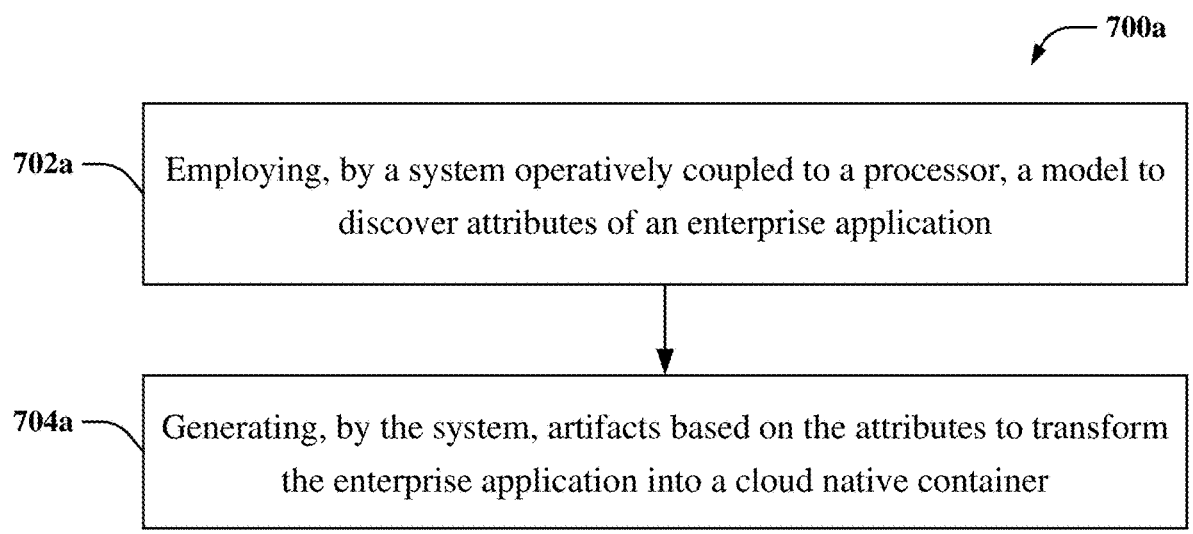
FIGS. 7A and 7B illustrate flow diagrams of example, non-limiting computer-implemented methods that can facilitate transformation of an enterprise application into a cloud native container in accordance with one or more embodiments described herein.

FIG. 7A illustrates a flow diagram of an example, non-limiting computer-implemented method 700a that can facilitate transformation of an enterprise application into a cloud native container in accordance with one or more embodiments described herein. Repetitive description of like elements and/or processes employed in respective embodiments is omitted for sake of brevity.

At 702a, computer-implemented method 700a can comprise employing, by a system, (e.g., via application transformation system 102 and/or analysis component 108) operatively coupled to a processor (e.g., processor 106, a quantum processor, etc.), a model (e.g., a model defined above with reference to FIG. 1) to discover attributes (e.g., application classes, build, configuration and properties, data dependencies, library dependencies, resource dependencies, data processes, etc.) of an enterprise application (e.g., a polyglot application, a packaged application, etc.).

At 704a, computer-implemented method 700a can comprise generating by the system (e.g., via application transformation system 102 and/or transformation component 110) artifacts (e.g., development artifacts, build artifacts, deployment artifacts, operations artifacts, continuous integration and continuous deployment (CI/CD) artifacts, etc.) based on the attributes to transform the enterprise application into a cloud native container.

Figure 7B:
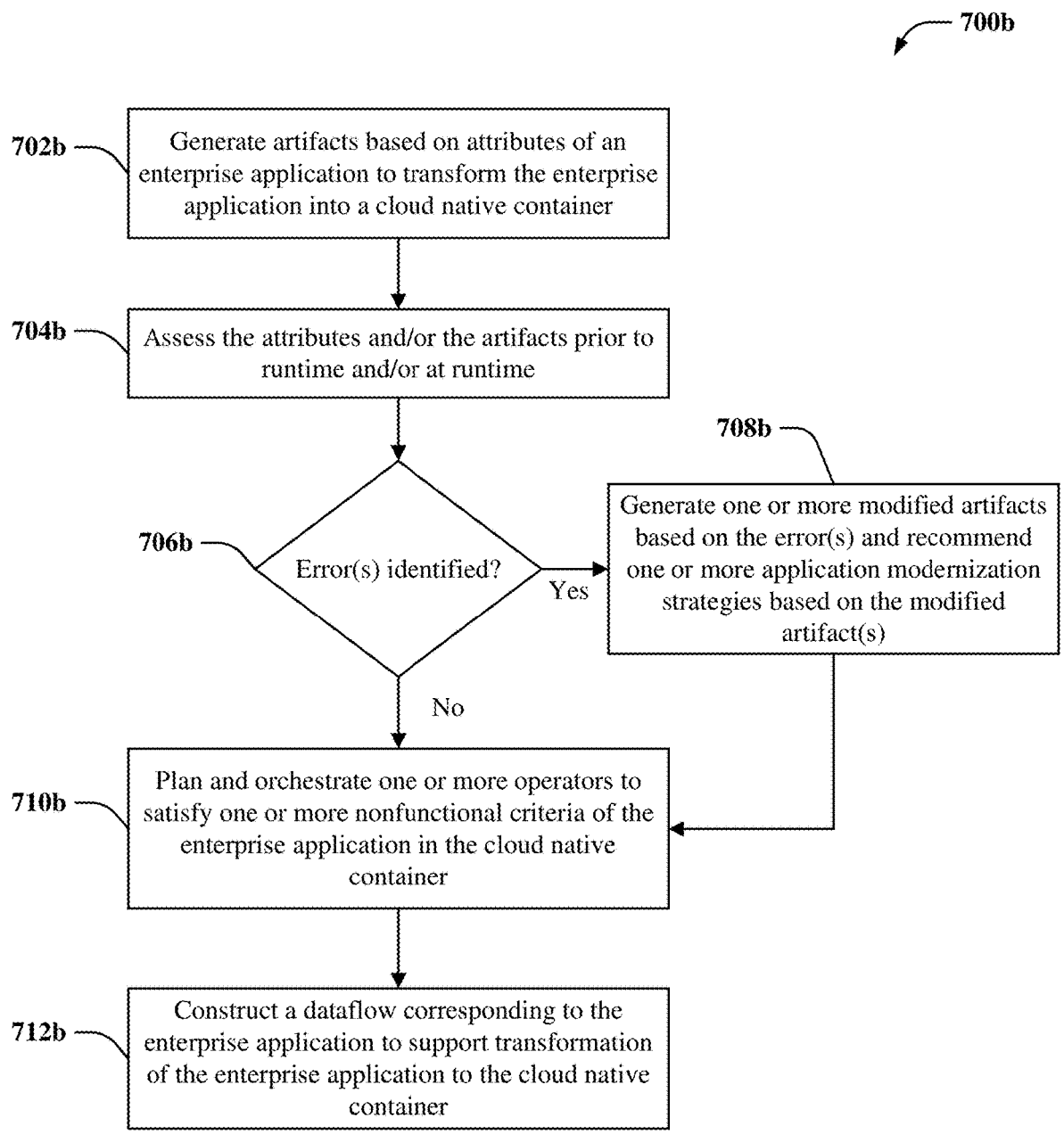

FIG. 7B illustrates a flow diagram of an example, non-limiting computer-implemented method 700b that can facilitate transformation of an enterprise application into a cloud native container in accordance with one or more embodiments described herein. Repetitive description of like elements and/or processes employed in respective embodiments is omitted for sake of brevity.

At 702b, computer-implemented method 700b can comprise generating (e.g., via application transformation system 102 and/or transformation component 110) artifacts based on attributes of an enterprise application to transform the enterprise application into a cloud native container. For example, as described above with reference to FIGS. 1, 2, and 3, based on the attributes (e.g., application classes, build, configuration and properties, data dependencies, library dependencies, resource dependencies, data processes, etc.) of an enterprise application (e.g., a polyglot application, a packaged application, etc.) that can be discovered by analysis component 108, transformation component 110 can generate artifacts (e.g., development artifacts, build artifacts, deployment artifacts, operations artifacts, continuous integration and continuous deployment (CI/CD) artifacts, etc.) to transform the enterprise application into a cloud native container.

At 704b, computer-implemented method 700b can comprise assessing (e.g., via application transformation system 102 and/or analysis component 108) the attributes and/or the artifacts prior to runtime and/or at runtime. For example, as described above with reference to FIGS. 1, 2, and 5, analysis component 108 can employ multi-factor checklists such as, for instance, checklists 500a, 500b to perform assessments of the enterprise application (e.g., the attributes) and/or the cloud native container (e.g., the artifacts) prior to runtime and/or at runtime to determine at least one of application cloud native readiness, application cost to benefit, or application modernization strategy.

At 706b, computer-implemented method 700b can comprise determining (e.g., via application transformation system 102 and/or analysis component 108) whether one or more errors are identified in the attributes and/or the artifacts assessed at 704b. If it is determined at 706b that one or more errors are identified in the attributes and/or the artifacts, at 708b, computer-implemented method 700b can comprise generating (e.g., via transformation component 110) one or more modified artifacts based on the error(s) and recommending (e.g., via transformation component 110) one or more application modernization strategies based on the modified artifact(s). For example, as described above with reference to FIGS. 1, 2, and 5, based on one or more errors identified by analysis component 108 in the attributes of an enterprise application and/or the artifacts generated by transformation component 110, transformation component 110 can generate one or more modified artifacts to replace and/or correct such erroneous artifacts. In this example, based on generation of such one or more modified artifacts by transformation component 110 as described above, transformation component 110 can further recommend one or more application modernization strategies (e.g., to inform owner of enterprise application and/or accelerate transformation of the enterprise application to a cloud native container). In an example, transformation component 110 can recommend one or more application modernization strategies corresponding to the enterprise application. In another example, transformation component 110 can recommend modifications to application computation logic corresponding to the enterprise application. In another example, transformation component 110 can recommend modifications to application computation logic, configuration and property extraction, service innovation, and/or DevOps artifact specifications.

Based on such generation of modified artifact(s) and recommendation of one or more application modernization strategies at 708b, or if it is determined at 706b that one or more errors are not identified in the attributes and/or the artifacts, at 710b, computer-implemented method 700b can comprise planning and orchestrating (e.g., via application transformation system 102 and/or transformation component 110) one or more operators to satisfy one or more nonfunctional criteria of the enterprise application in the cloud native container. For example, as described above with reference to FIGS. 1, 2, 6A, and 6B, transformation component 110 can plan and orchestrate one or more operators to satisfy one or more non-functional criteria (also referred to herein as nonfunctional criteria) of the enterprise application in the cloud native container. For instance, transformation component 110 can plan and orchestrate one or more operators to satisfy (e.g., address, cope with, etc.) non-functional criteria including, but not limited to: session persistence; backing services; state management; atomicity, consistency, isolation, and durability (ACID) properties of data transactions; and/or another non-functional criteria of the enterprise application in the cloud native container.

At 712b, computer-implemented method 700b can comprise constructing (e.g., via application transformation system 102, analysis component 108, transformation component 110, etc.) a dataflow corresponding to the enterprise application to support transformation of the enterprise application to the cloud native container. For example, as described above with reference to FIGS. 1, 2, and 4, transformation component 110 can construct a dataflow corresponding to an enterprise application to support transformation of the enterprise application to a cloud native container. In an example, transformation component 110 can discover and/or construct one or more dataflows of an enterprise application using data tainting (e.g., also referred to as taint checking) and/or runtime tracking. In this example, transformation component 110 can increase data flow coverage using multi-armed bandits learning. The resulting dataflow can be used to enhance application configuration and data dependency discovery, inform constraints and criteria on application refactoring, and support test case generations.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
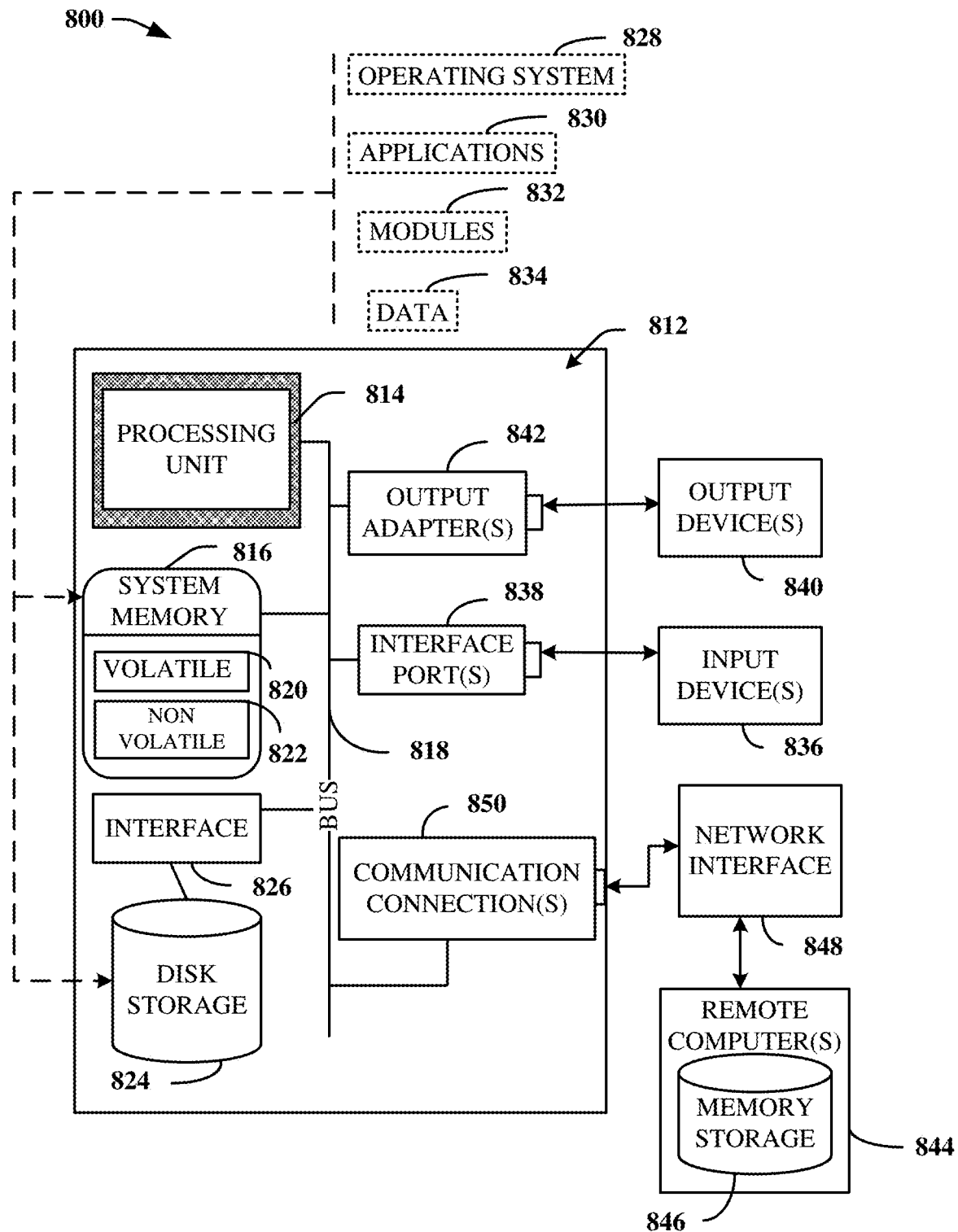
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
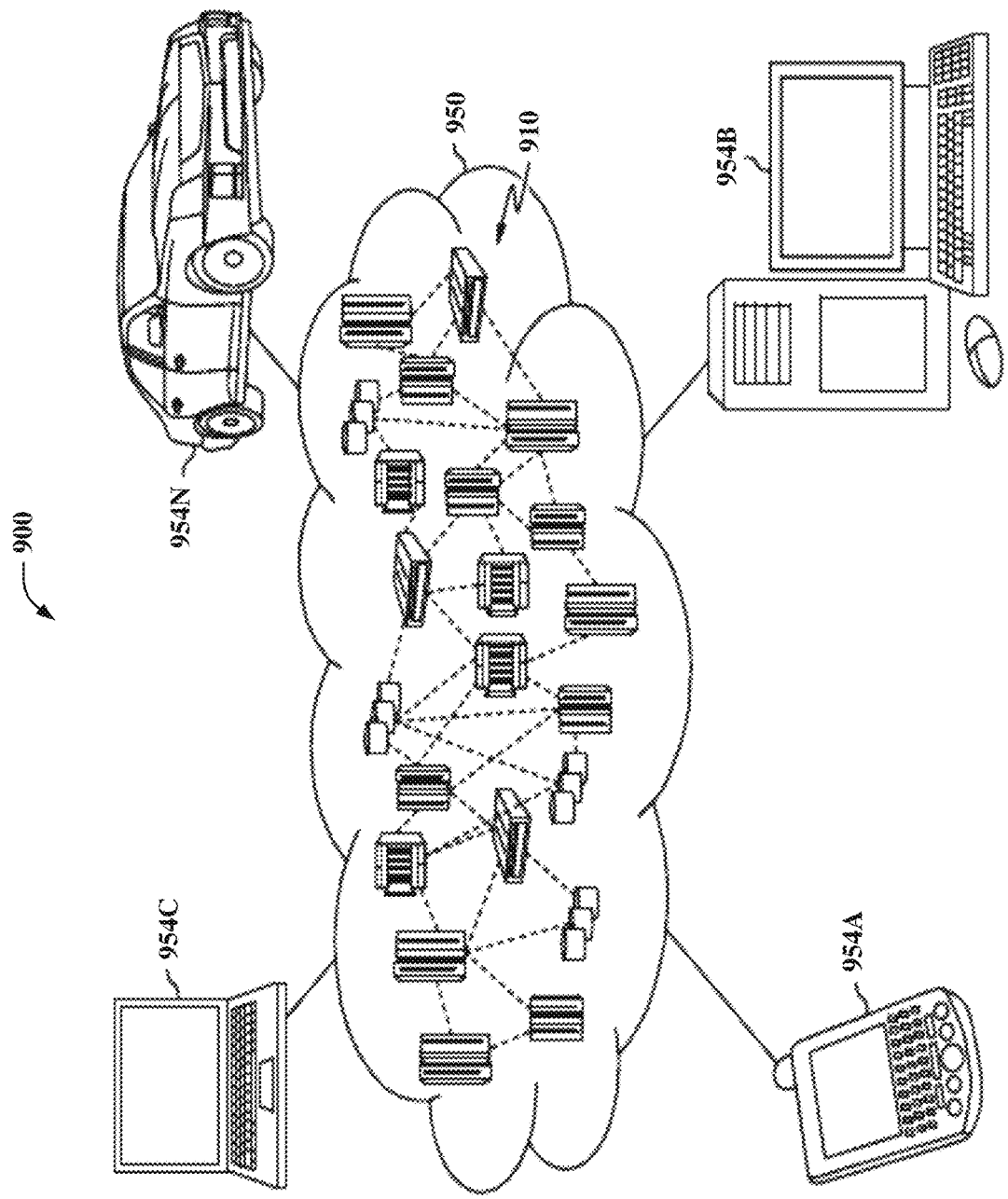
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Although not illustrated in FIG. 9, cloud computing nodes 910 can further comprise a quantum platform (e.g., quantum computer, quantum hardware, quantum software, etc.) with which local computing devices used by cloud consumers can communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
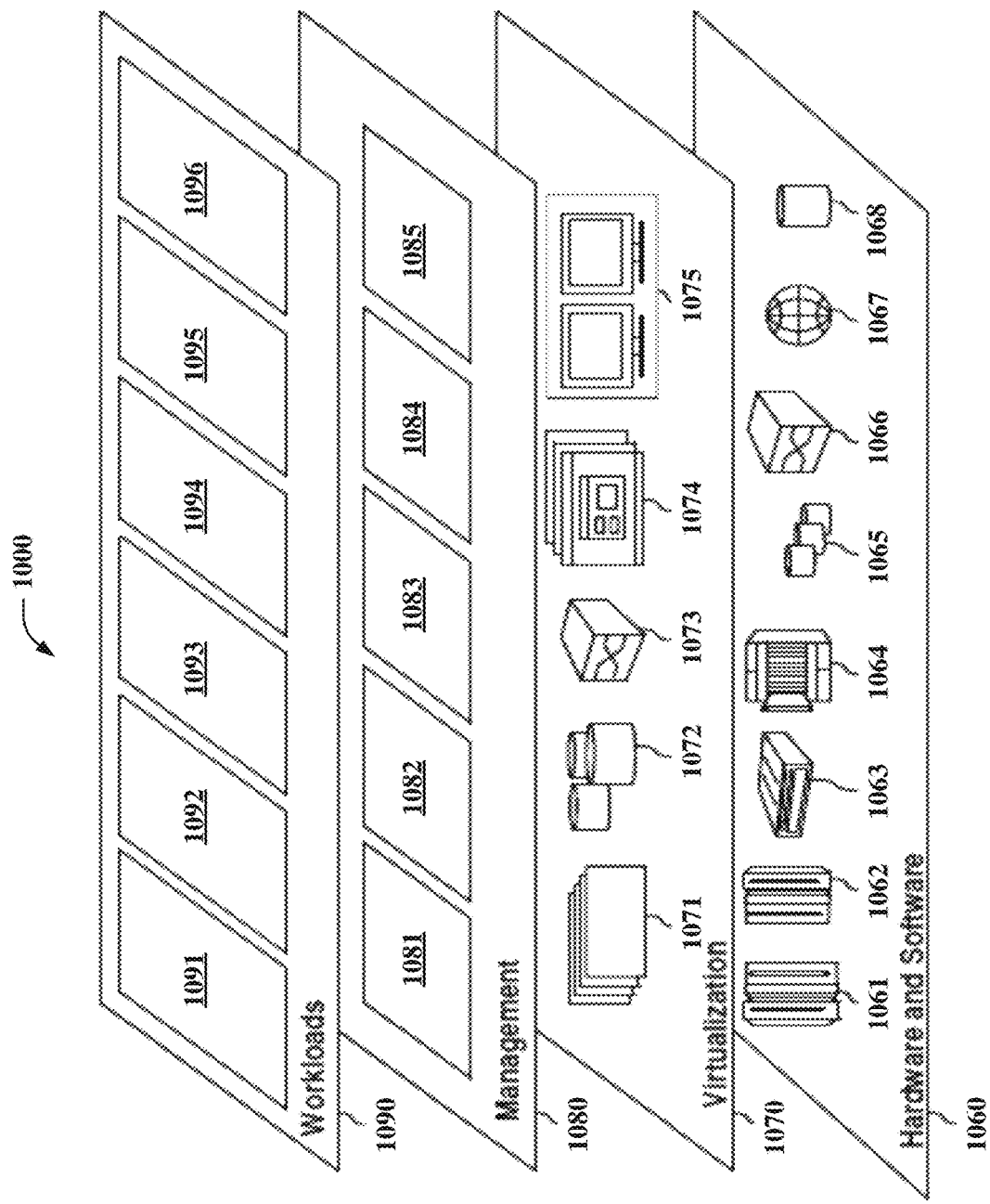
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067, quantum platform routing software 1068, and/or quantum software (not illustrated in FIG. 10).

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and application transformation software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
   an analysis component that employs a model to discover attributes of an enterprise application; and
   a transformation component that generates:
   artifacts, based on the attributes, to transform the enterprise application into a cloud native container, wherein the artifacts comprise at least one of a runnable script or runnable code, and
   test cases, based on the attributes and using a data tainting process, to test the artifacts, wherein the data tainting process employs multi-armed bandits learning to increase dataflow coverage of the enterprise application, and the increased dataflow coverage is employable to enhance application configuration and data dependency discovery, to inform constraints and criteria on application refactoring, and for the generation of the test cases.

2. The system of claim 1, wherein the artifacts are selected from a group consisting of one or more: development artifacts, build artifacts, deployment artifacts, operations artifacts, and continuous integration and continuous deployment artifacts.

3. The system of claim 1, wherein the analysis component performs assessments of the cloud native container prior to runtime and at runtime to determine at least one of application cloud native readiness, application cost to benefit, or application modernization strategy.

4. The system of claim 1, wherein the analysis component identifies an error in at least one of the attributes of the enterprise application or the artifacts based on the test cases, and wherein the transformation component generates one or more modified artifacts based on the error, thereby facilitating at least one of reduced application transformation time, improved processing efficiency of the processor, or reduced computational costs of the processor.

5. The system of claim 1, wherein the transformation component generates one or more modified artifacts based on an error identified in at least one of the attributes of the enterprise application or the artifacts, and wherein the transformation component recommends one or more application modernization strategies corresponding to the enterprise application based on the one or more modified artifacts.

6. The system of claim 1, wherein the transformation component plans and orchestrates one or more operators to satisfy one or more nonfunctional criteria of the enterprise application in the cloud native container.

7. The system of claim 1, wherein the transformation component identifies, based on the test cases, one or more missing attributes of the enterprise application that were not identified by the model.

8. A computer-implemented method, comprising:
employing, by a system operatively coupled to a processor, a model to discover attributes of an enterprise application;
generating, by the system based on the attributes, artifacts to transform the enterprise application into a cloud native container, wherein the artifacts comprise at least one of an executable script or executable code; and
generating, by the system based on the attributes and using a data tainting process, test cases, to test the artifacts, wherein the data tainting process employs multi-armed bandits learning to increase dataflow coverage of the enterprise application, and the increased dataflow coverage is employable to enhance application configuration and data dependency discovery, to inform constraints and criteria on application refactoring, and for the generation of the test cases.

9. The computer-implemented method of claim 8, wherein the artifacts are selected from a group consisting of one or more: development artifacts, build artifacts, deployment artifacts, operations artifacts, and continuous integration and continuous deployment artifacts.

10. The computer-implemented method of claim 8, further comprising:
performing, by the system, assessments of the cloud native container prior to runtime and at runtime to determine at least one of application cloud native readiness, application cost to benefit, or application modernization strategy.

11. The computer-implemented method of claim 8, further comprising:
identifying, by the system based on the test cases, an error in at least one of the attributes of the enterprise application or the artifacts; and
generating, by the system, one or more modified artifacts based on the error, thereby facilitating at least one of reduced application transformation time, improved processing efficiency of the processor, or reduced computational costs of the processor.

12. The computer-implemented method of claim 8, further comprising:
generating, by the system, one or more modified artifacts based on an error identified in at least one of the attributes of the enterprise application or the artifacts; and
recommending, by the system, one or more application modernization strategies corresponding to the enterprise application based on the one or more modified artifacts.

13. The computer-implemented method of claim 8, further comprising:
planning, by the system, one or more operators to satisfy one or more nonfunctional criteria of the enterprise application in the cloud native container; and
orchestrating, by the system, the one or more operators to satisfy the one or more nonfunctional criteria of the enterprise application in the cloud native container.

14. The computer-implemented method of claim 8, further comprising:
identifying, by the system, based on the test cases, one or more missing attributes of the enterprise application that were not identified by the model.

15. A computer program product facilitating a process to transform an enterprise application into a cloud native container, the computer program product comprising a computer readable storage medium having program instructions embodied therewith, the program instructions executable by a processor to cause the processor to:
employ, by the processor, a model to discover attributes of an enterprise application;
generate, by the processor based on the attributes, artifacts to transform the enterprise application into a cloud native container, wherein the artifacts comprise at least one of a runnable script or runnable code; and
generate, by the processor based on the attributes and using a data tainting process, test cases, to test the artifacts, wherein the data tainting process employs multi-armed bandits learning to increase dataflow coverage of the enterprise application, and the increased dataflow coverage is employable to enhance application configuration and data dependency discovery, to inform constraints and criteria on application refactoring, and for the generation of the test cases.

16. The computer program product of claim 15, wherein the artifacts are selected from a group consisting of one or more: development artifacts, build artifacts, deployment artifacts, operations artifacts, and continuous integration and continuous deployment artifacts.

17. The computer program product of claim 15, wherein the program instructions are further executable by the processor to cause the processor to:
perform, by the processor, assessments of the cloud native container prior to runtime and at runtime to determine at least one of application cloud native readiness, application cost to benefit, or application modernization strategy.

18. The computer program product of claim 15, wherein the program instructions are further executable by the processor to cause the processor to:
identify, by the processor based on the test cases, an error in at least one of the attributes of the enterprise application or the artifacts; and
generate, by the processor, one or more modified artifacts based on the error.

19. The computer program product of claim 15, wherein the program instructions are further executable by the processor to cause the processor to:
generate, by the processor, one or more modified artifacts based on an error identified in at least one of the attributes of the enterprise application or the artifacts; and recommend, by the processor, one or more application modernization strategies corresponding to the enterprise application based on the one or more modified artifacts.

20. The computer program product of claim 15, wherein the program instructions are further executable by the processor to cause the processor to:
plan, by the processor, one or more operators to satisfy one or more nonfunctional criteria of the enterprise application in the cloud native container; and
orchestrate, by the processor, the one or more operators to satisfy the one or more nonfunctional criteria of the enterprise application in the cloud native container.

\* \* \* \* \*